Aug. 26, 1952 H. H. RAYMOND ET AL 2,608,089
APPARATUS FOR AND METHOD OF INSPECTING
SEALED CONTAINERS FOR RELATIVE
INTERNAL PRESSURE CONDITIONS
Filed July 11, 1947 4 Sheets-Sheet 1
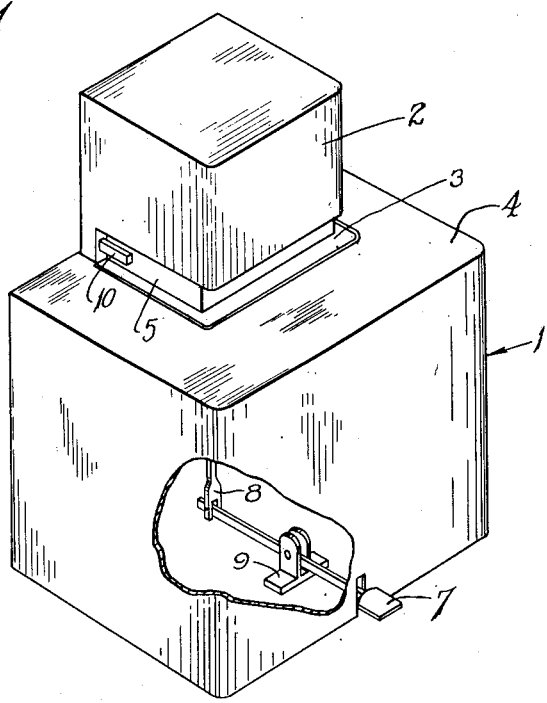
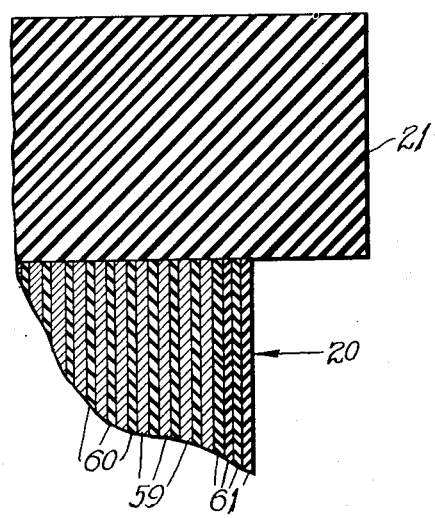
INVENTORS
HORACE H. RAYMOND
PHILIP BLISS
WILLIAM G. COE
PAUL J. CAMPBELL
BY Parham & Bates
ATTORNEYS Aug. 26, 1952
H. H. RAYMOND ET AL
2,608,089
APPARATUS FOR AND METHOD OF INSPECTING
SEALED CONTAINERS FOR RELATIVE
INTERNAL PRESSURE CONDITIONS
Filed July 11, 1947
4 Sheets-Sheet 2
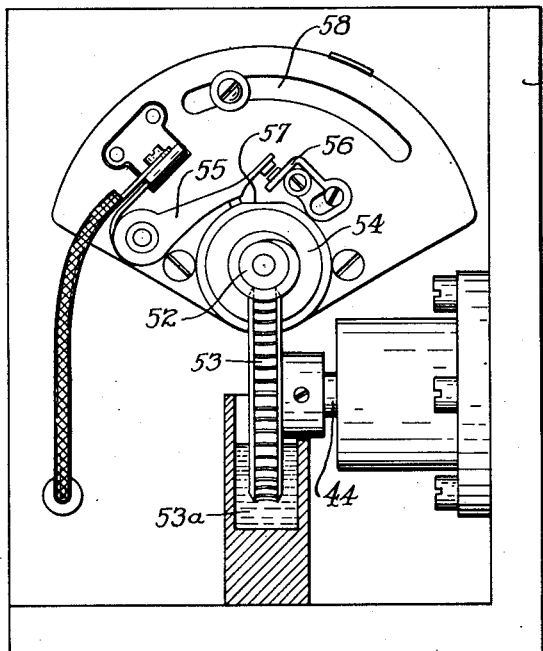
Fig. 6
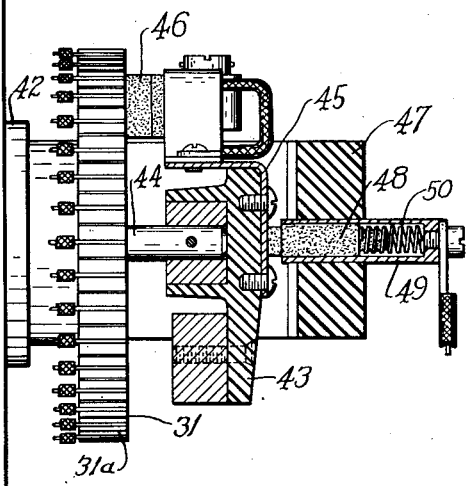
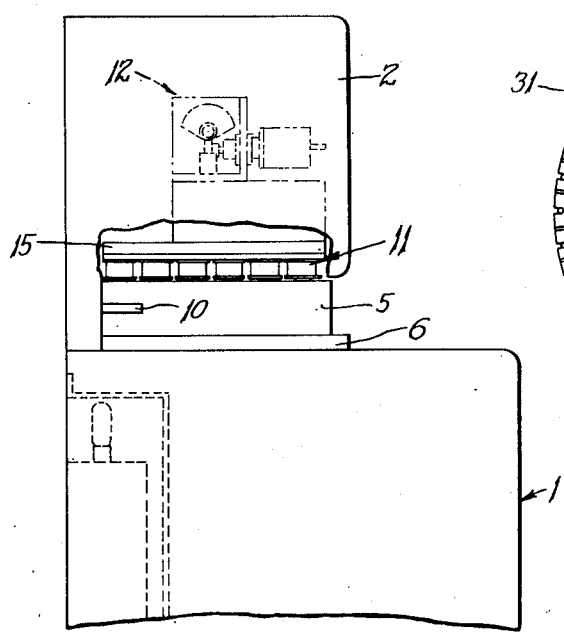
Fig. 2
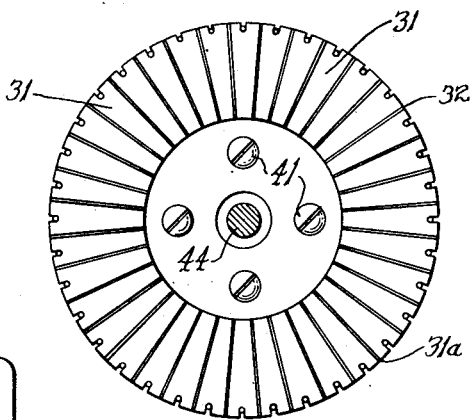
Fig. 8
INVENTORS
HORACE H. RAYMOND
PHILIP BLISS
WILLIAM G. COE
PAUL J. CAMPBELL
BY Parham + Bates
ATTORNEYS Aug. 26, 1952   H. H. RAYMOND ET AL   2,608,089
APPARATUS FOR AND METHOD OF INSPECTING
SEALED CONTAINERS FOR RELATIVE
INTERNAL PRESSURE CONDITIONS
Filed July 11, 1947   4 Sheets-Sheet 3
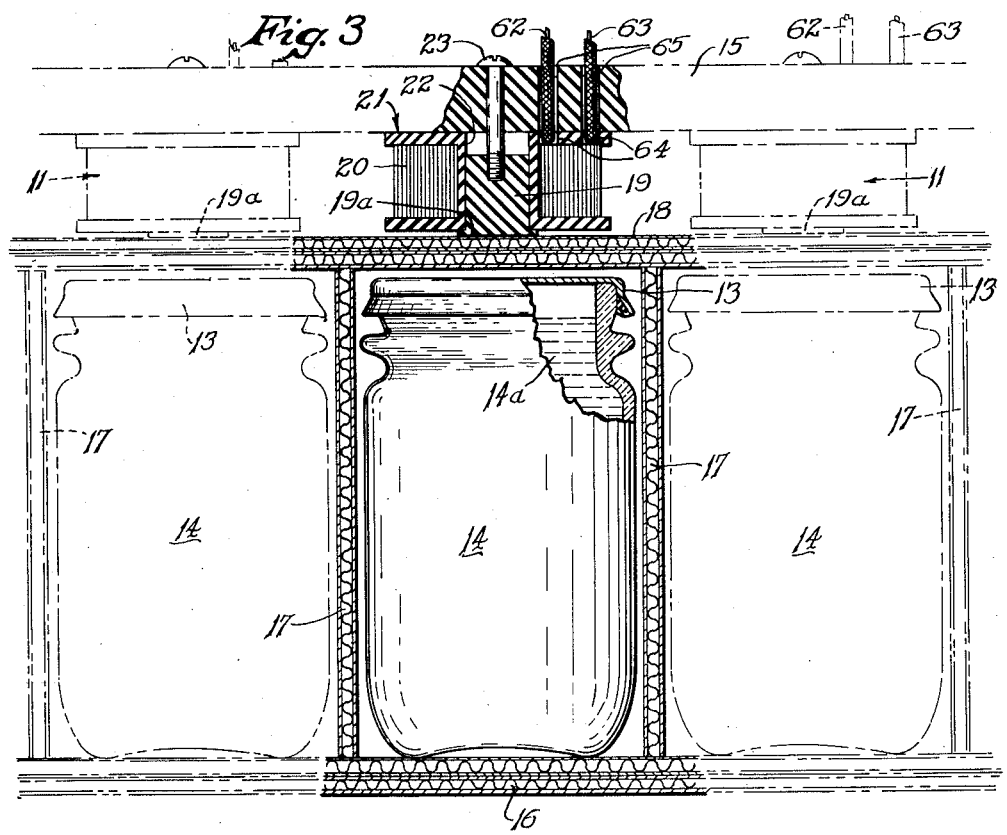
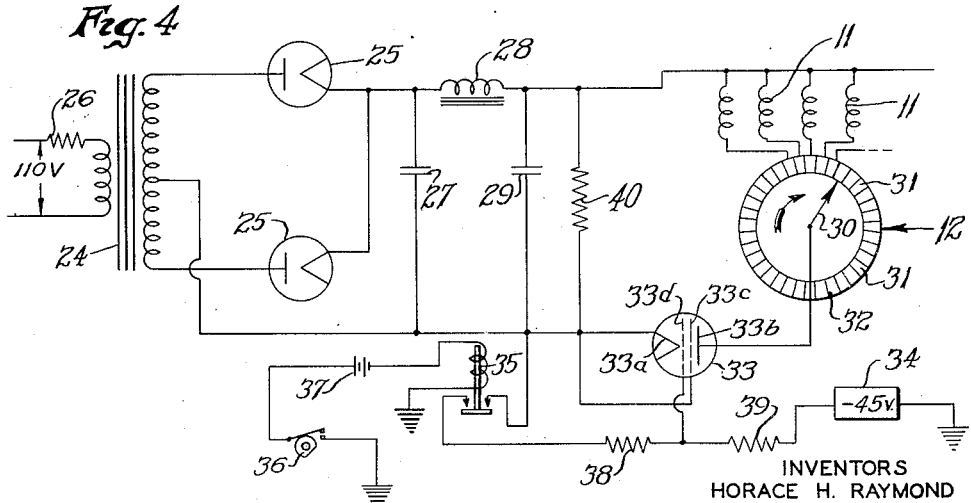
INVENTORS
HORACE H. RAYMOND
PHILIP BLISS
WILLIAM G. COE
PAUL J. CAMPBELL
BY Parham & Bates
ATTORNEYS

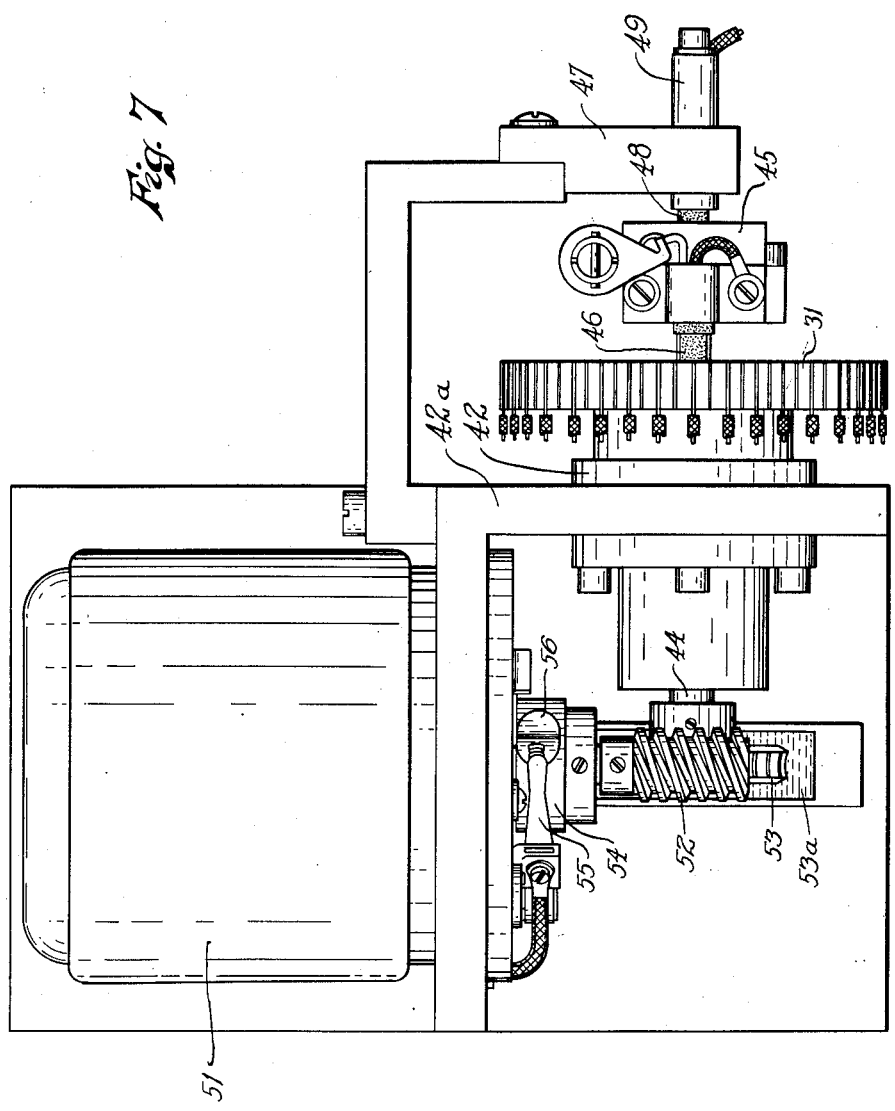

Patented Aug. 26, 1952

2,608,089

UNITED STATES PATENT OFFICE 2,608,089

APPARATUS FOR AND METHOD OF INSPECTING SEALED CONTAINERS FOR RELATIVE INTERNAL PRESSURE CONDITIONS

Horace Hovey Raymond, Berlin, Philip Bliss, Newington, William Grant Coe, Gildersleeve, and Paul John Campbell, Middletown, Conn., assignors to Emhart Manufacturing Company, a corporation of Delaware Application July 11, 1947, Serial No. 760,474

13 Claims. (Cl. 73—52)

The present invention relates to a means for and method of testing sealed containers and like articles in order to ascertain the pressure conditions existing therein and relates more particularly to the testing of pressure conditions within glass containers that are hermetically sealed by metallic closures.

An object of the invention is to provide for inspection or test of a container having an electrically conductive end closure or other defining wall by the production of a vibration or sound from such wall indicative of the pressure conditions within the container. Such vibration or sound may be produced according to the invention by creating briefly a powerful magnetic field which will flex the defining wall, either by virtue of its magnetic characteristics or by inducing eddy currents therein.

It is an object of the present invention to provide an apparatus for and method of checking internal pressure conditions of sealed containers that are totally encased within a shipping carton of like enclosure without contact of the inspection apparatus with the containers.

More specifically, it is within the purview of the present invention to inspect closed cartons of sealed containers to detect the presence of defectively sealed containers therein without the opening of the cartons.

It is a further object of the present invention to provide a simple automatic device for rapidly inspecting large numbers of packaged containers for proper container sealing conditions without individual handling of the containers.

Another object of the present invention is to provide a completely automatic device for individually inspecting closed cartons of containers filled with food products in order to detect those cartons holding defectively sealed containers or containers filled with spoiled food.

A still further object of this invention is the provision of a device for and method of exciting a container cap or end closure to produce audible sound, it not being necessary for any part of the device to be in contact with any portion of the container or cap.

Other objects and advantages of the present invention will become apparent or be pointed out in the course of the following description of a preferred embodiment shown in the accompanying drawings in which:

Figure 1 is a perspective view of the inspection apparatus, showing a closed carton of containers resting on a vertically movable platform of the device prior to the inspection operation, a portion of the apparatus being broken away to show means for imparting movements to the platform;

Figure 2 is a side elevation view of the inspection apparatus, showing a carton of containers in proper position to be inspected relative to a plurality of operatively associated electromagnetic coils, a portion of a surrounding enclosure being broken away to facilitate a clear presentation of the coils;

Figure 3 is an elevation view of a plurality of packaged upright containers having their sealing caps operatively positioned relative to the plurality of associated electromagnetic coils;

Figure 4 is a schematic diagram of an electronic circuit by means of which the electromagnetic coils of the inspection apparatus are sequentially energized to excite the sealing caps of the associated containers, thereby to produce audible sounds;

Figure 5 is an enlarged fragmentary vertical section view of an electromagnetic coil of the type shown in Figure 2;

Figure 6 is an elevation view of an electrical commutator device which is a component of the electronic circuit shown in Figure 4 and aids in effecting sequential operation of the electromagnetic coils;

Figure 7 is a plan view of the electrical commutator device, shown in Figure 6, showing an electric motor for driving the rotary members of the device; and Figure 8 is an elevation view of a plurality of contact faces of a commutator plate which is a component of the commutator device.

The apparatus of the preferred embodiment of the present invention is adapted for creating a vibratory motion in a portion of the cap of a sealed jar or other glass container by magnetic impulsion, the vibratory motion being intense enough to set up audible sound waves by the tone and pitch of which an attendant can easily judge the relative magnitude of absolute pressure existing inside the container. The lower the pressure, or larger the vacuum, within the jar, the more highly stressed will be the cap and the clearer will be the sound emanating therefrom when the cap is excited in a vibratory manner. If a very small vacuum or even atmospheric pressure exists inside the jar, the cap will give a duller sound.

Generally speaking, the present embodiment consists of a plurality of electromagnetic coils which are placed in preferred positions relative to a plurality of glass jars, the caps of the jars being located adjacent to the ends of the corresponding coils. Each coil of the plurality is operatively connected to an electronic circuit which includes, as a component thereof, a continuously operating commutator which sequentially energizes each of the coils for a very brief period of time. The energization of each coil creates a strong magnetic field through the cap of the associated jar, thereby magnetically flexing the cap and producing a distortion of a portion thereof. The energization of the coil is abruptly interrupted, thereby causing a collapse of the associated magnetic field and permitting the distorted jar cap to vibrate with less than critical damping until the cap has returned to a quiescent condition. As the plurality of coils are sequentially energized, a series of sounds is produced, each sound indicating by its tonal quality the relative magnitude of the absolute pressure existing inside an associated jar.

No contact between the present device and containers being inspected is necessary for satisfactory operation. Thus, cartons of containers may be inspected as units without being opened and without individual handling of the enclosed containers, it merely being necessary to hold the carton in proper spaced relationship with the plurality of coils. Normally, the closer the coils are brought to the caps of the jars and the thinner the walls of the carton, the louder are the sounds audible to the attendant. The commercially available cartons used for packing food jars cause no adverse effects on operation of the hereindescribed inspection apparatus.

From the foregoing, it will be obvious to those skilled in the art that thin diaphragm-like jar caps favor the production of audible sounds, and for this reason, it will be understood that the present device is admirably suited to the testing of containers, such as baby food jars, which are vacuum sealed with thin metal cap closures, such as those made by the White Cap Company of Chicago, Illinois. From the magnetic operating principles of the device, it will also be apparent that good magnetic qualities of the jar caps aid in the effectiveness of the device.

Jars of food are normally "vacuum-packed" by the food processor so that a predetermined vacuum or, in other words, absolute pressure exists within each jar. Occasionally, because of defects in the jars, caps, or processing machinery, or bad handling after packaging some of the jars have within them or later acquire an excess of air, thereby causing an insufficient vacuum. The presence of such air may foster putrefaction of the food products with an attendant evolution of gas, the gas evolved further raising the absolute pressure within the jar. Use of the hereindisclosed device will make possible the easy, rapid detection of cartons having within them one or more defective jars with relatively excessive internal pressures. The cartons thus detected may be segregated for appropriate further action in view of the presence therein of defective jars.

Referring to Figure 1, the apparatus of the present invention comprises a box-like cabinet generally designated 1 to which is rigidly connected a smaller box-like enclosure 2 beneath which is positioned a movable elevating platform 3 which is normally flush with surface 4 of the cabinet but is vertically movable to a relatively raised position during the testing of a carton 5 of containers, as indicated at 6 in Figure 2. Raising and lowering movements may be imparted to platform 3 by any conventional device such as a pedal 7, linkage 8, and fixed fulcrum 9 which may be seen through the broken away portion of Figure 1. An attendant may slide the carton of containers to be inspected along surface 4 onto lowered platform 3, the carton being guided into position beneath enclosure 2 by yieldable guide fingers, one of which is shown at 10 in Figures 1 and 2. The operator may then push down on pedal 7 to raise carton 5 into inspection position adjacent to a plurality of electromagnetic coils, generally designated 11, in Figures 2 and 3.

Each coil is sequentially energized by an electronic circuit (see Fig. 4) incorporating a commutator device, generally designated 12, housed within enclosure 2, to produce audible sound from caps 13 secured to jars 14 filled with food products 14a or other "vacuum packed" material. Referring to Figure 3, the coils may be secured at evenly spaced intervals to a mounting plate 15, made from any suitable dielectric material. The spacing of the coils corresponds to the location of jars 14 within a shipping carton 16, having divider members 17 to protect and separate the jars from one another. Figure 3 shows the carton of jars in its raised position, the upper face 18 of the carton bearing against relatively enlarged or flanged lower end portions 19a of plugs 19 which are associated with the coils as shown in the cross section of the center coil of Figure 3. Each coil consists of windings 20 formed around a spool, generally designated 21, having a central aperture 22 therethrough. Plugs 19 may be positioned in the apertures of the coils with the protruding lower end portions 19a bearing against the spools thereof and may be engaged from above by screws 23 to hold the coils adjacent to and beneath mounting plate 15. The details of the coil construction will be disclosed more fully hereinafter with reference to Figure 5.

The electronic circuit for energizing the coils is shown diagrammatically in Figure 4. This circuit includes a conventional full wave rectifier comprising a transformer 24 and rectifier tubes 25, a protective resistor 26 being included in the primary of the transformer to limit the transformer peak current and to minimize line disturbance. Rectified current is fed from the rectifier through a circuit which includes condenser 27 and inductance 28, this circuit being adapted for increasing the voltage to which a condenser 29 may be charged. The condenser 29 thus may be charged with a relatively large amount of energy. The energy stored in this condenser is periodically discharged, at the proper time in its charging cycle, through one of the plurality of coils 11, after which discharge, the condenser is again recharged in preparation for a subsequent discharge through another of the plurality of coils. In order to shift electrical connections to make possible the discharge of the energy of condenser 29 through each of the coils sequentially, commutator device 12 is incorporated in the circuit. The details of construction of commutator 12 will be considered hereinafter with reference to Figures 6, 7 and 8. Essentially the commutator may be considered to be a continuously rotating conducting finger 30 which moves sequentially over a plurality of arcuate shaped contacts 31 which are insulated from one another, as indicated at 32. Each coil of the plurality is connected to one of the contacts 31 and is energized while the rotating finger makes electrical connection with the associated contact.

It has been found desirable in practice to use the commutator merely as a means for distributing the energy and to provide supplementary means to regulate the instant at which the energy is permitted to flow to conducting finger 30 and thence to one of the coils. In the present embodiment, the desired regulation is accomplished by a thyratron tube 33, the filament 33a of which is connected to one side of the condenser 29 and the plate 33b of which is connected to finger 30. Screen grid 33c of the tube is connected to the filament circuit. It will be obvious to those skilled in the art that by suitable control of the potential of control grid 33d the thyratron may be used to regulate the flow of energy from condenser 29 to finger 30. The control grid may be maintained at a negative potential, such as —45 volts, by a battery 34, to prevent firing of the tube. At predetermined times the potential of the control grid may be changed in a positive direction by connection of the filament potential to the control grid by the closing of a normally open relay or solenoid switch 35. Since the filament of the tube in the present device preferably is maintained substantially at ground potential, the connection thereto of the control grid will fire the thyratron, permitting the discharge of energy through an associated coil.

The firing of the thyratron may be synchronized with the position of finger 30 so as to occur only when conducting finger 30 is resting entirely on one of the contacts 31. This may be done by means of a cam operated switch 36 which is synchronized in its rotation with the rotation of finger 30. The switch, as will be more fully disclosed hereinafter, is closed for a very brief period of time, thereby completing a circuit, including a battery 37 and relay 35, thus closing relay 35 momentarily.

Protective resistors 38 and 39 may be connected in the control grid circuit to protect the thyratron tube. As a safeguard to personnel working on the device, a resistor 40 may be connected across condenser 29 to permit the condenser to dissipate its energy slowly in the event that the means for discharging the condenser through the coils is rendered inoperative.

Due to the reactance of each of coils 11, a transient wave is caused by the discharge of the condenser through a coil. When in the course of the transient wave, the plate of the tube becomes negatively charged, flow of current through the tube is interrupted and is not resumed until the tube is again fired by the closing of relay 35.

As shown in Figures 6, 7 and 8 arcuate contacts 31 may take the form of an equally sectorially divided cylindrical member 31a which may be attached by screws 41 to a stationary supporting structure 42 which in turn is rigidly connected to support bracket 42a. Conducting finger 30 may take the form of a rotor 43 made from insulating material. The rotor may be continuously rotated with shaft 44 and may be provided with an associated metallic electrical conducting bracket 45 with which is associated for electrical conduction a spring loaded brush 46 which may be operatively positioned relative to arcuate contacts 31. A mounting block 47 of insulating material may be secured to mounting bracket 42a and may aid in positioning a carbon contact rod 48 which is disposed within conducting housing 49 within which is a spring 50 which permits electrical conduction from housing 49 to carbon rod 48 and thence to bracket 45. Thus, electrical connection can be made easily to rotor 43 at all times regardless of the position of the rotor relative to the supporting structure.

Shaft 44 may be continuously rotated by means of electrical motor 51, Fig. 7, driving a worm 52 which is engaged with a worm wheel 53 secured to one end of shaft 44. Worm wheel 53 may rotate in an oil bath 53a to provide lubrication for the running parts. Driven concurrently with worm 52 by electrical motor 51 is cam member 54. Cooperatively positioned relative to it is a spring loaded contact arm 55, Figs. 6 and 7, positioned to make electrical contact intermittently with stationary contact 56. Arm 55 and contact 56 constitute cam operated switch 36 shown in the electronic circuit of Figure 4. A small flat 57 may be provided on the cam contour, which is cylindrical at all other points, to permit spring arm 55 to move towards stationary contact 56 periodically for a brief period. The making of electrical contact between arm 55 and contact 56 completes the electrical circuit energizing relay 35 which in turn fires the thyratron tube.

Conventional means may be provided as at 58 to permit the synchronization of the cam operated switch relative to the position of conducting finger 30. The ratio of reduction between worm 52 and worm wheel 53 is established with reference to the number of arcuate contacts 31 of contact cylinder 31a. Thus, if thirty-six contacts are provided, as in the present device, the ratio of the gear reduction should be 36:1 to permit one complete revolution of cam member 54 for each fractional 1/36 of a revolution of rotor 43 relative to contact cylinder 31a. When the commutator device is synchronized properly by means of conventional means 58, contact arm 55 will be permitted to make electrical connection to contact 56 when carbon brush 46 is centrally disposed on any one contact 31. The connection of arm 55 with contact 56 is broken before brush 46 moves off of the contact 31 and onto another adjacent arcuate contact. When adjusted in this way there will be little or no tendency for arcing to occur between adjacent arcuate contacts 31 and brush 46. After being energized by the closure of cam operated switch 36, relay 35 closes abruptly, thereby firing the thyratron tube in a brief time period, preferably in less than 5% of the total time required for one complete revolution of the cam member. The rapid discharge of the condenser through the thyratron and an associated coil 11 produces the desirable impulsion of the related jar cap and thus produces a clear, distinct, audible sound from the jar cap.

It has been found that in the present embodiment the desired wave form of the thyratron grid voltage can be obtained conveniently by the use of cam operated switch 36 in conjunction with relay 35. The relay of the present device is a Millisec relay, made by the Arnold-Stevens Company of South Boston, Massachusetts. It is contemplated, however, that other switching devices may be used to produce rapid firing of the thyratron tube and that many conventional modifications of the structure herein disclosed will occur to those skilled in the art.

Details of construction of the electromagnetic coils of the present apparatus are shown in Figure 5. The windings 20 of each coil may consist of a continuous ribbon of copper foil 59 and a continuous ribbon of paper 60 wound cooperatively on spool 21 to form alternate layers of copper and paper. As the ribbons of paper and copper are wound on the spool, a thin layer of commercially available polymerizing electrical varnish may be applied between the opposed faces of the ribbons. The paper ribbon used in the present embodiment is one-half thousandth of an inch thick and the copper ribbon used is two thousandths of an inch thick. The windings of each coil consist of 168 turns of copper and paper ribbon with a few extra turns of paper ribbon, as indicated at 61, sealed with electrical varnish, to complete the coil. Lead wires 62 and 63, shown in Figure 3, may be soldered to the ends of the copper ribbon and passed through holes 64, Fig. 3, provided in spool 21 and holes 65 of mounting plate 15. After the coil has been completely wound, it may be baked at a temperature commensurate with the type of varnish and paper used. It is to be noted that the data on the coil construction given herein is by way of preference rather than limitation, other thicknesses of copper and paper and different numbers of turns also being practicable in the present device. Also, silver or any other suitable electrically conductive material may be used instead of copper. Instead of paper, foil ribbon coated with enamel or covered with any kind of insulation or any other suitable insulating material may be used.

A coil constructed and arranged as hereinbefore described has important advantages in the device of the present invention. By providing such a coil, we have obviated mechanical noises which present a serious problem in the operation of other coils due to inductive action on their relatively movable electrically conductive turns as the exciting current is passed therethrough. Such noises are prevented in the present coil without the necessity of binding or securing the component turns of the coil together by an adhesive material or binding substance to prevent relative movement therebetween. In the case of ordinary coils, such an expedient is necessary to obtain a measure of relief from the mechanical noises. Also, our coil is easily constructed, is compact and powerful and will effectively resist the disruptive action occasioned by the sudden discharge of energy therethrough.

As an aid in minimizing extraneous noises from the apparatus, it has been found advantageous to reduce the amount of paramagnetic materials near the coils to a minimum. For this reason, the spools 21 and plugs 19 preferably, although not necessarily, should be made from a dielectric material such as reinforced plastic. Screws 23 preferably should be made from a diamagnetic material, such as brass, although other materials may also be used.

We have particularly described herein one illustrative embodiment of our invention as designed for use and as it may be used to test "vacuum-packed" containers, typically glass jars, having thin end closures or caps of magnetic material, audible sounds being produced to indicate the pressure conditions therein. Our invention, however, contemplates various modifications of the illustrative device and other applications and uses thereof. Thus, our invention may be used to test containers having end closures or defining walls which may be non-magnetic but electrically conductive or in which the pressures may be other than a partial vacuum. The end closures or defining walls of the containers tested may be acted upon according to the invention to produce vibrations or sounds which are not in the audible range and these may be rendered effective by suitable cooperative mechanisms to indicate an unsatisfactory pressure condition in any of the tested containers, as by giving an audible or visible signal or initiating operation of a "reject" mechanism by which the defective tested container would be separated from the good ones.

Having described our invention and a practical application thereof, we claim:

1. An inspection device comprising a plurality of electromagnetic coils spaced from one another so as to correspond to the positions of a plurality of containers having electrically conductive end closures enclosed within a sealed carton to be inspected, means to position the carton adjacent to said coils, and means to automatically energize each of said coils individually a like predetermined amount and once only to produce an audible sound from successive containers corresponding in position to each of the coils energized.

2. A device for inspecting containers for internal pressure conditions by the production of a sound from an electrically conductive defining wall thereof comprising an electromagnet including a coil having electrically conductive ribbon and insulating ribbon wound in alternate layers and electrical means for energizing said electromagnet with a single discharge of electrical energy of very brief duration.

3. Apparatus as defined in claim 1 in which each of said coils comprises windings of foil ribbon of electrically conductive material and ribbon of insulating material wound in alternate layers, said coils being soundless when energized.

4. An inspection device comprising a plurality of electromagnetic coils spaced from one another to correspond in location to the position of a plurality of encased containers to be inspected, said containers each having an electrically conductive end closure, means for supporting said encased containers with said closures in position adjacent to said coils, means for storing electrical energy, distributing means to connect said electrical storage means to each of said coils to energize said coils sequentially by the discharge of electrical energy from said storage means through each of said coils, and means to replenish the electrical energy in said storage means after each discharge through one of said coils.

5. Apparatus as defined in claim 4 in which each of said coils comprises windings of electrically conductive foil ribbon and insulating ribbon wound in alternate layers.

6. Means for inspecting a carton at a time sealed containers having electrically conductive end closures located within the carton, comprising a mounting plate, a plurality of electromagnetic coils secured at predetermined intervals to said mounting plate, means for supporting a sealed carton of containers, means for moving said carton supporting means to a predetermined position relative to said coils, and electrical means to energize each of said coils sequentially by means of a sudden discharge of electrical energy therethrough.

7. A device for inspecting packaged containers having electrically conductive end closures for internal pressure conditions comprising a supporting structure, a mounting plate secured to said supporting structure, a plurality of electromagnetic coils secured at predetermined positions to said mounting plate, a movable elevating platform cooperatively positioned relative to said coils, means to impart raising and lowering movements to said platform, and electrical means to energize each of said coils sequentially, 8. Apparatus as defined in claim 7 in which said last named electrical means comprises a full wave rectifier, a charging circuit operatively associated with said rectifier, a condensed unit connected to said charging circuit, a thyratron tube connected to said condenser, means to fire said thyratron tube at predetermined times, to pass energy stored in said condenser, and means to distribute the energy passed by said thyratron tube to each of said coils sequentially.

9. Apparatus as defined in claim 8 in which each of said coils comprises a spool having windings of electrically conductive foil ribbon and insulating ribbon wound in alternate layers which are silent when the coils are energized.

10. The method of inspecting a closed carton of sealed containers for proper container sealing conditions comprising placing a plurality of electromagnetic coils opposite the carton in position corresponding to the locations of the containers therein and sequentially energizing each of the coils with a single impulse of electrical energy, each discharge being of an identical magnitude and of a relatively short duration.

11. The method of testing a hermetically sealed container having an end wall of magnetic material capable of outward flexure under an adequate stress and adapted to snap back instantly on removal of said stress, comprising the steps of applying a magnetic impulse to said end wall of the sealed container through a non-magnetic wall of a packing container in which said sealed container is located to flex said end wall outwardly and terminating said magnetic impulse quickly after the application thereof to cause a sound indicative of the pressure condition within the sealed container when said end wall thereof snaps back.

12. The method of testing a sealed container having an end wall of electrically conductive material adapted to flex under an adequate magnetic load and to snap back instantly on removal of said load, comprising the steps of applying a single impulse electromagnetically to said end wall to flex it, terminating said impulse on said wall quickly after the application thereof to cause, as the end wall snaps back, a sound having a tonal quality indicative of a particular pressure condition within the sealed container.

13. In the art of inspecting hermetically sealed containers having end closures of electrically conductive material adapted to flex under an adequate magnetic load and to snap back instantly on removal of said magnetic load, said containers being packed in cartons, each containing a plurality of said containers and each having a non-conductive wall next to said end closures, the method which comprises applying like impulses electromagnetically through said non-conductive wall of each such carton to the end closures of the vacuum-sealed containers therein individually to flex said end closures, terminating each such impulse quickly after the application thereof to an end closure to cause, as the latter springs back, an audible sound indicative of the particular pressure condition within the carton, whereby to determine whether or not all the containers in the carton have satisfactory pressure conditions therewithin.

HORACE HOVEY RAYMOND.
PHILIP BLISS.
WILLIAM GRANT COE.
PAUL JOHN CAMPBELL.

REFERENCES CITED

The following references are of record in the file of this patent:

UNITED STATES PATENTS

| Number | Name | Date |
|---|---|---|
| 1,781,775 | Capps | Nov. 18, 1930 |
| 1,869,067 | Malmquist | July 26, 1932 |
| 1,956,301 | Richardson | Apr. 24, 1934 |
| 1,990,085 | Mudge et al. | Feb. 5, 1935 |
| 2,320,390 | Shmurak | June 1, 1943 |
| 2,362,470 | De Rosa | Nov. 14, 1944 |
| 2,425,613 | Gibbs | Aug. 12, 1947 |